United States Patent
Nakamura et al.

(10) Patent No.: US 6,258,503 B1
(45) Date of Patent: *Jul. 10, 2001

(54) PRODUCTION PROCESS OF COLORED FINE PARTICULATE COMPOSITION AND COLORED FINE PARTICULATE COMPOSITION PRODUCED BY THE PROCESS

(75) Inventors: Michiei Nakamura; Hiroyuki Shimanaka; Kazuo Kanou; Masayuki Takahashi; Yukio Kanbara; Masayuki Kinnou; Chikamasa Nakamura; Keiji Nakajima, all of Tokyo (JP)

(73) Assignee: Dainichiseika Color & Chemicals Mfg. Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/087,911

(22) Filed: Jun. 1, 1998

(30) Foreign Application Priority Data

Jun. 5, 1997 (JP) ........................................ 9-162020

(51) Int. Cl.⁷ .................................................. G03G 9/087
(52) U.S. Cl. ........................ 430/137; 430/114; 430/109; 264/141; 264/143
(58) Field of Search ..................................... 430/109, 137, 430/114; 524/604, 605; 264/141, 171.1, 75, 143

(56) References Cited

U.S. PATENT DOCUMENTS

| 5,169,582 | 12/1992 | Illing | 264/141 |
|---|---|---|---|
| 5,372,864 * | 12/1994 | Weaver et al. | 430/109 |
| 5,571,655 * | 11/1996 | Mahabadi et al. | 430/137 |
| 5,629,121 * | 5/1997 | Nakayama | 430/109 |
| 5,658,704 * | 8/1997 | Patel et al. | 430/137 |
| 5,780,196 * | 7/1998 | Fujiwara et al. | 430/137 |
| 5,958,643 * | 9/1999 | Fujiwara et al. | 430/114 |

OTHER PUBLICATIONS

Diamond, A, S. ed. *Handbook of Imaging Materials*, Marcel Dekker, Inc, NY (1991), pp 193–195.*

* cited by examiner

*Primary Examiner*—Janis L. Dote
(74) *Attorney, Agent, or Firm*—Oblon, Spivak, McClelland, Maier & Neustadt, P.C.

(57) ABSTRACT

A process is provided for producing a colored fine particulate composition by dissolving or dispersing a coloring matter or a coloring matter and charge control agent in a condensation-polymerized resin component and forming the resultant resin composition into fine particles. The coloring matter or the coloring matter and charge control agent are added to a raw material component for the production of the resin component, or to the resin component in a period from initiation to completion of polymerization of the resin component or while the resin component is in a molten state subsequent to the completion of the polymerization, whereby the coloring matter or the coloring matter and charge control agent are dissolved or dispersed in the resulting resin component. A colored composition obtained subsequent to the dissolution or the dispersion is cooled. The colored composition so cooled is then formed into fine particles.

25 Claims, No Drawings

PRODUCTION PROCESS OF COLORED FINE PARTICULATE COMPOSITION AND COLORED FINE PARTICULATE COMPOSITION PRODUCED BY THE PROCESS

BACKGROUND OF THE INVENTION

1. Field of the Invention

This invention relates to a process for producing a colored image-recording composition for electrophotography, electronic printing, electrostatic recording or the like or a colored composition for fluidized bed coating, electrostatic powder coating, powder coating or fine-powdery-resin-type coating, and also to a colored fine particulate composition obtained by the process.

2. Description of the Background

To obtain a colored image-recording composition, especially a colored image-recording composition capable of producing a picture having uniform tone and color density, it has been the conventional practice to first produce a natural resin (feedstock resin) through a polymerization process and, subsequent to cooling of the resin into flakes, to subject the resulting resin to processing such as coarse grinding, fine grinding, sacking, storage and shipping. Further, upon production of a toner for electrophotography or the like, materials required for the production—such as the thus-stored fine powder of the natural resin for the toner and a coloring matter and, if necessary, a charge control agent—are weighed based on a predetermined formula. Subsequent to their mixing in a mixer such as a tumbling mixer or Henschel mixer, the resultant mixture is fed to a resin kneader such as a twin-roll mill, triple-roll mill or kneader, where the mixture is heated to a temperature at least equal to a melting temperature of the resin, for example, to 130 to 180° C. to melt the resin so that the coloring matter and, if any, the charge control agent are kneaded and dispersed in the resin. This conventional process requires such irksome and time-consuming processing, and consumes enormous heat energy is enormous.

SUMMARY OF THE INVENTION

The present inventors have proceeded with an extensive investigation to develop a production process for the economical and rational mass production of a colored fine particulate composition of excellent quality while overcoming the above-described problems about the production of conventional colored fine particulate compositions, for example, colored image-recording compositions, an economical problem of distribution of the natural resin upon its production, sacking, storage and shipping, and problems such as the irksomeness of the production steps of the colored fine particulate composition and the substantial consumption of energy due to overlapping in the steps. As a result, it has been found that a colored fine particulate composition, which is excellent in the dispersion of a coloring matter and the like and can produce a picture having uniform tone and color density, can be economically furnished by simultaneously conducting the production of a resin and the production of the colored fine particulate resin composition. Based on this finding, the present inventors proceeded with a further investigation, leading to the completion of the present invention.

DETAILED DESCRIPTION OF THE PREFERRED EMBODIMENTS

In one aspect oaf the present invention, there is thus provided a process for producing a colored fine particulate composition by dissolving or dispersing a coloring matter or a coloring matter and charge control agent in a condensation-polymerized resin component and forming the resultant resin composition into fine particles, wherein the coloring matter or the coloring matter and charge control agent are added to a raw material component for the production of the resin component, or to the resin component in a period from initiation to completion of polymerization of the resin component or while the resin component is in a molten state subsequent to the completion of the polymerization, whereby the coloring matter or the coloring matter and charge control agent are dissolved or dispersed in the resulting resin component; a colored composition obtained subsequent to the dissolution or the dispersion is cooled; and the colored composition so cooled is then formed into fine particles. In another aspect of the present invention, there is also provided a colored fine particulate composition obtained by the process.

To use the above-described colored fine particulate composition as a dry or wet image-recording, colored composition, the colored fine particulate composition is classified as needed, and known additives such as a fluidizing agent, a ferromagnetic carrier material and a liquid dispersion medium are mixed.

According to the present invention as described above, it is possible to provide an image-recording, colored composition useful for electrophotography, electronic printing or electrostatic recording and also a colored fine particulate composition useful as a fluidized bed coating formulation, electrostatic powder coating formulation, power coating formulation or fine-powdery-resin-type coating formulation.

Further, the rationalized production steps of excellent economy that the production of the resin and the production of the colored fine particulate composition, especially the image-recording, colored composition are conducted at the same time have made it possible to overcome the conventional drawbacks such as the irksomeness and the substantial consumption of heat energy in the production and distribution of the natural resin and the production steps of the image-recording, colored composition and further to achieve the economical and rational mass-production of a colored fine particulate composition which is excellent in quality, especially is superb in the dispersion of the coloring matter and can produce a picture having uniform tone and color density.

According to the process of the present invention as applied for the production of an image-recording, colored composition, a coloring matter, such as a pigment, and a charge control agent, which have been finely dispersed in advance, are added and mixed concurrently with the polymerization reaction of a resin component as a binder, whereby the image-recording, colored composition is obtained with excellent dispersion of the coloring matter in a form free of coarse particles of the coloring matter. Therefore, a picture formed with the colored composition is excellent in vividness and transparency. The image-recording, colored composition according to the present invention is hence suited for copying an image not only on a paper sheet but also on an overhead projector film.

On top of the quality, the process according to the present invention has also been found to bring about significant merits from the standpoints of production steps and economy. Taking the resin component as an example, all the conventional steps subsequent to the polymerization reaction, that is, cooling, coarse grinding, fine grinding, sacking, storage, shipping and the like are no longer needed.

Upon production of the image-recording, colored composition as a developer, the premixing step of powders—such as the resin component, the coloring matter and the charge control agent—and its subsequent melting and kneading steps are no longer needed. The production process is substantially simplified, thereby saving heat energy and also making a substantial economical contribution to the reduction of the production cost.

The present invention will hereinafter be described in further detail on the basis of preferred embodiments.

In the process according to the present invention, it is necessary to dissolve or finely disperse the coloring matter and, if any, the charge control agent (hereinafter called "the coloring matter and the like") in the resin upon production of the colored fine particulate composition. By conducting this dissolution or dispersion step during the condensation polymerization step of the resin, the production steps of the colored fine particulate composition are rationalized. A description will hereinafter be made about specific examples of a method for conducting this dissolution or dispersion step during the condensation polymerization step of the resin.

(1) The coloring matter and the like are dissolved or finely dispersed beforehand in the raw material for the condensation-polymerized resin, and the condensation polymerization reaction is allowed to proceed in the presence of the coloring matter and the like.

(2) The coloring matter and the like are added and mixed in the course of the polymerization reaction of the condensation-polymerized resin, for example, the coloring matter and the like are dissolved or finely dispersed in the resin while resin is still in the stage of an oligomer, and the polymerization reaction is allowed to proceed further until completion.

(3) After the polymerization reaction of the condensation-polymerized resin is completed, the coloring matter and the like are added to and mixed in the molten resin in a polymerization reactor, whereby the coloring matter and the like are dissolved or finely dispersed in the resin.

(4) The polymerization reaction is brought to completion, and the condensation-polymerized resin in a molten form is fed, for example, to an extruder fitted with an automatic metering device. While automatically metering the coloring matter and the like through the automatic metering device, the coloring matter and the like are charged and added by a side feeder of the extruder. The coloring matter and the like are then kneaded with the resin component in a molten form and are caused to spread in the resin component, so that the coloring matter and the like are dissolved or finely divided.

All the above-exemplified methods are very preferred.

Examples of the extruder useful in the above method (4) can include screw-type extruders such as a single-screw extruder, a co-rotating or counter-rotating twin-screw extruder and a multi-screw extruder; rotor-type extruders such as a twin-screw kneader; and a single-screw or multi-screw, continuous kneader. In these extruders, various segments such as screws, kneading discs and rotors can be combined as desired, and their cylinder lengths and shapes can be varied. It is also possible to use two or more of these extruders in combination. Moreover, each extruder may be provided with a vent hole as needed, and may also be evacuated through a vacuum vent in some instances.

The coloring matter and the like, which are added in the above-described process, can be used as a high-concentration composition by finely dispersion them beforehand at high concentrations in a portion of the raw material of the resin component, a portion of an oligomer of the resin component and/or a portion of the resin component. This is preferable for dissolving and finely dispersing the coloring matter and the like in the resin component by kneading them with the resin component in a molten form and allowing them to spread in the resin component.

In the above-described process, the formation of the condensation-polymerized resin, which contains the coloring matter and the like added and dispersed therein, into fine particles can be conducted by choosing a conventionally-known suitable fine grinding method in accordance with the application purpose of the colored fine particulate composition.

When the colored fine particulate composition is used as a dry developer or the like, its fine grinding is conducted by a dry jet mill in many instances. The particle size of the dry developer may be from about 3 to 20 $\mu$m, preferably from about 5 to 10 $\mu$m in terms of average particle size. In the case of a wet developer, namely, when the composition is finely ground in a water system and is then dried into a wet developer, on the other hand, the find grinding is conducted by a wet disperser with a tumbling medium contained therein. The particle size of the wet developer may be from about 0.5 to 10 $\mu$m, preferably from about 1 to 5 $\mu$m in terms of average particle size. When the composition is finely ground in a wet disperser of the water system with a tumbling medium contained therein and is then dried into a dry developer, the particle size of the finely ground product may also range from 3 to 20 $\mu$m, preferably from about 5 to 10 $\mu$m in terms of average particle size.

As the resin component for use in the present invention, resins composed primarily of polyester resins are preferred. Among these, a resin component composed primarily of a polyester resin, which is formed from an aromatic diol component or alicyclic diol component and a dicarboxylic acid component as principal raw materials, is especially preferred for its high glass transition temperature and its rather low melting point and melt viscosity.

The high glass transition temperature of the resin exhibits superb resistance to the blocking problem that the colored fine particulate composition (for example, toner) is caused to cohere into a mass during its storage or use in a use environment of high temperature, for example, during the summer season, in a hot area or at a hot office or workshop. The relatively low melting point and melt viscosity of the resin are contradictory in properties with the high glass transition temperature, but lead to excellent properties such as fixing and color vividness when a picture is formed on a base material such as a paper sheet or a film. Owing to these properties, the resin component is brought into a molten state of low viscosity in a condensation polymerization reactor or extruder, so that the added coloring material and the like can be evenly dissolved or finely dispersed in the resin component in the molten form.

A diol component as a primary raw material for the polyester resin useful in the present invention is at least one compound selected from the group consisting of alkylene oxide adducts of bisphenol A, bisphenol F, bisphenol AF and bisphenol S, in which alkylene chains are $C_2$–$C_4$ alkylene chains, hydrogenation products of said alkylene oxide adducts of said bisphenols, bis(hydroxymethyl)naphthalene, bis(hydroxymethyl)-durene, p-xylylene glycol, bis (hydroxyethoxy)benzene, bis($\alpha$-hydroxyisopropyl)benzene, and bis(hydroxymethyl)-cyclohexane. In addition, one or more known diol components such as ethylene glycol, diethylene glycol, propylene glycol and/or dipropylene glycol may also be used in combination.

A dicarboxylic acid component as another primary raw material for the polyester resin is at least one compound selected from aromatic, alicyclic and aliphatic dicarboxylic acids such as terephthalic acid, isophthalic acid, 4,4'-biphenyldicarboxylic acid, naphthalene-2,6-dicarboxylic acid, 1,4-cyclohexanedicarboxylic acid, 1,2-cyclohexanedicarboxylic acid, 1,2-cyclohexenedicarboxylic acid, methylnadic acid, fumaric acid and maleic acid, and lower alkyl esters, acid halogenides and acid anhydrides thereof.

Among the above-exemplified dicarboxylic acids, those particularly preferred as raw materials for polyester resins useful in the present invention are aromatic or alicyclic dicarboxylic acids having carboxyl groups at symmetrical positions such as 1- and 4-position and low m.w. aliphatic dicarboxylic acids having 2 to 3 carbon atoms, which can bring about properties such as high glass transition temperatures and sharp melt property owing to their high crystallinity.

The production of a polyester resin from such aromatic diol component and dicarboxylic acid component as principal raw materials can be conducted following a conventional production process of a polyester resin.

For example, the aromatic diol component and the dicarboxylic acid component are charged in a condensation polymerization reactor which is equipped with raw material inlets, a stirrer, a thermometer, a nitrogen gas inlet tube, and a water measuring trap having a condenser connected to a pressure-reducing apparatus. Under heating and stirring, these components are subjected at 100° C. to 250° C. for about 5 to 7 hours to a dehydrating condensation reaction while removing water. If necessary, the condensation polymerization reaction is continued for 1 to 3 hours under reduced pressure to bring the reaction to completion, whereby a polyester resin usable in the present invention is obtained. Although conventionally-known condensation catalysts can be used, zinc acetate, antimony trioxide, tetrabutyl titanate and the like are preferred.

Properties preferred for the resin component used in the production process of this invention for the colored fine particulate composition include a glass transition temperature of about 50° C. or higher, notably of from 50 to 65° C., a softening point of from about 100 to 150° C., preferably from 100 to 130° C., sharp melt property, and a solid state at room temperature. Its average molecular weight may range from about 1,000 to 50,000, preferably from about 5,000 to 10,000. The resin component therefore features a significantly lower melt viscosity compared with general thermoplastic resins.

The coloring matter employed in the present invention can be selected from conventionally-used chromatic or black oil-soluble dyes, dispersion dyes, organic pigments, carbon black pigments, inorganic pigments, finely-divided ferromagnetic materials, and white organic pigments and inorganic pigments.

As a pigment for use in the present invention, a conventionally-known chromatic, black or white pigment can be used. Illustrative are azo pigments, polycondensation azo pigments, azomethineazo pigments, azomethine pigments, anthraquinone pigments, phthalocyanine pigments, perione/perylene pigments, indigo/thioindigo pigments, dioxazine pigments, quinacridone pigments, isoindolinone pigments and aniline black pigments; ion oxide pigments, finely-divided ferromagnetic materials, spinel-type pigments, carbon black pigments, and titanium oxide pigments.

Particularly preferred pigments can be cyan pigments such as C.I. Pigment Blue 15:3, C.I. Pigment Blue 16, and phthalimidomethyl-substituted copper phthalocyanine blue; magenta pigments such as C.I. Pigment Red 122 and γ-type unsubstituted quinacridone, and solid solutions thereof; yellow pigments such as C.I. Pigment Yellow 93, 94, 128, 166, 167, 138, 185, and disanthraquinonyl-monophenylamino-s-triazine; black pigments such as C.I. Pigment Black 7, 6, and the azomethineazo-base black pigments disclosed in JP kokai 4-27547. These pigments can be used either singly or in combination.

Further, the term "ferromagnetic material" as used herein means a conventionally-known ferromagnetic materials selected from chromatic or black magnetic iron oxide, magnetic metals, magnetic chromium oxide or the like.

As the charge control agent, one or more of conventionally-employed charge control agents are also usable in the present invention. Illustrative negative charge control agents can include metal complex salts such as the chromium, aluminum and zinc complex salts of salicylic acid and its derivatives, and azo complex salt dyes, while illustrative positive charge control agents can include nigrosine, tertiary amino compounds, and quaternary amino compounds.

Although the contents of the coloring matter and charge control agent in the colored fine particulate composition differ depending on the kind of the colored fine particulate composition, they can be similar to those in colored fine particulate compositions known to date. When the colored fine particulate composition according to the present invention is used as a dry developer for electrophotography or the like, the content of the coloring matter may range from about 1 wt. % to 20 wt. %, preferably from 2 wt. % to 8 wt. % or so, and the content of the charge control agent may range from about 1 wt. % to 10 wt. %, preferably from about 2 wt. % to 6 wt. %. When the colored fine particulate composition according to the present invention is used as a wet developer for electrostatic recording or the like, the content of the coloring matter may range from about 1 wt. % to 20 wt. %, preferably from 3 wt. % to 10 wt. % in the case of a concentrated stock solution and, in general, the colored fine particulate composition is used by diluting it 10-fold to 30-fold by volume in a diluent.

As has been described above, it is a very preferable method to use the coloring matter and the like in the form of a high-concentration composition in which the coloring matter and the like have been dissolved or finely divided beforehand at high concentrations tions in the resin component, such as the polyester resin, or a resin highly compatible with the resin component. Such a high-concentration composition contains the coloring matter and the like at the high concentrations and, when it is thoroughly kneaded beforehand to disperse the coloring matter and the like or it is subjected to color matching in advance, it facilitates subsequent steps. The high-concentration composition can be in any form, for example, in a solid form such as coarse particles, coarse powder, fine powder, a sheet or a small mass or in a paste or liquid form. The content of the coloring matter and the like in the high-concentration composition may range from about 10 wt. % to 70 wt. %, preferably from 20 wt. % to 60 wt. % or so.

Examples of a preparation method of the above-described high-concentration composition of the coloring matter and the like can include a dry elevated-temperature kneading dispersion method and a wet dispersion method making use of a tumbling medium such as ceramic beads, glass beads or steel balls. As a method for dispersing the coloring matter and the like at high concentrations in the resin, it is most preferred to melt the resin and to knead and disperse the coloring matter and the like with and in the resin by using a kneading disperser such as a two-roll mill, three-roll mill, heated kneader, heated elevated-pressure kneader, single-screw extruder or twin-screw extruder.

As the high-concentration dispersion method of the coloring matter and the like, the most preferred is to flush a water-base paste of the coloring matter and the like with a molten resin (melt flushing), for example, the method proposed in JP kokai 2-175770. Described specifically, the water-base case of the coloring matter and the like and the resin are charged without any solvent in a kneader or flusher which permits heating with steam. The contents are kneaded at atmospheric pressure to have the coloring matter and the like transferred into the resin phase, separated water is removed, and then, still remaining water is caused to evaporate while performing the kneading.

As a carrier resin upon preparation of the above-described high-concentration composition of the coloring matter and the like, it is possible to use not only a polyester resin of the same or similar type but also a resin having compatibility with such a polyester resin. Examples of the carrier resin can include addition polymerization resins such as polystyrene, styrene-(meth)acrylic acid ester copolymers, styrenemaleic acid ester copolymers, and (meth)acrylic acid ester polymers and copolymers; epoxy resins; and various waxes.

Among the above-exemplified resins, preferred resins are those having glass transition temperatures of about 50° C. or higher and softening points of about 90° C. to 150° C., preferably of from 100° C. to 130° C. and being in solid forms at room temperature.

The condensation-polymerized resin obtained as described above and containing the coloring matter and the like therein is then cooled and formed into fine particles. When it is used as an image-recording, colored composition (toner or developer), it is classified by a usual method as needed, followed the addition and mixing of known additives such as a fluidizing agent, a ferromagnetic material as a carrier, and a liquid dispersion medium.

The colored fine particulate composition obtained in accordance with the present invention is also useful as a color-coating, colored composition for fluidized bed coating, electrostatic powder coating, powder coating or fine-powdery-resin-type coating in addition to the image-recording, colored composition. It is useful especially for the "powder coating, powder coating method, and powder-coated article" disclosed in the specification of JP kokai 10-120945.

The present invention will hereinafter be described more specifically by the following Examples. It is however to be noted that the present invention is not limited to these Examples. All designations of "part or parts" or "%" in the Examples are by weight unless otherwise specifically indicated.

EXAMPLE 1

(1) Preparation of a Concentrated Blue Pigment-diol Dispersion

To 80 parts of a bisphenol A-propylene oxide adduct (hydroxyl number: 321), 17 parts of a copper phthalocyanine blue pigment (C.I. Pigment Blue 15:3) and 3 parts of a phthalimidomethylated copper phthalocyanine blue (average number of phthalimidomethyl groups: 2 groups/mole) were added. Subsequent to stirring and mixing, the pigments were finely dispersed by using a three-roll mill, whereby a concentrated blue pigment dispersion was prepared. As a result of an observation of the dispersion under a microscope, all the pigment particles were found to be finely dispersed without coarse particles.

(2) Preparation of a Concentrated Charge Control Agent-resin Composition

Fine powder of a polyester resin (70 parts; number average molecular weight: about 6,000), which had been obtained by condensation polymerization of dimethyl terephthalate and the bisphenol A-propylene oxide adduct, and 30 parts of a negative charge control agent of the chromium complex salt type were premixed in a high-speed mixer and then kneaded in a heated three-roll mill. Subsequent to cooling, the resulting mass was ground, thereby preparing fine powder of a concentrated charge control agent composition.

(3) Condensation Polymerization Reaction of a Polyester Resin

The bisphenol A-propylene oxide adduct (783 parts; hydroxyl number: 321) was charged in a condensation polymerization reactor which was equipped with a stirrer, a thermometer, a nitrogen gas inlet tube, a water measuring trap having a coiled condenser connected to a pressure-reducing apparatus, and raw material inlets. Under stirring, 315 parts of the concentrated blue pigment-diol dispersion obtained in the above procedures (1) were added, followed by the charging of 536 parts of dimethyl terephthalate and 0.27 part of zinc acetate. The contents were heated under stirring to 230° C. to 240° C., at which a condensation reaction was conducted for about 6 hours. The condensation reaction was allowed to proceed further for 2 hours under reduced pressure to bring the reaction to completion. In addition, 150 parts of the fine powder of the concentrated charge control agent-resin composition obtained in the above procedures (2) were added and mixed, whereby the charge control agent was uniformly dispersed. The polyester resin component in the resultant blue-colored polymer was found to have a softening point of about 105° C., a glass transition temperature of about 59° C., and a number average molecular weight of about 6,000.

(4) Production of a Blue Image-recording Material

Then, the blue-colored polyester resin was taken out of the polymerization reactor and formed into a thin film through cooling rolls. After the thin film was cooled on a cooling belt, it was coarsely crushed into flakes, finely ground in a jet mill and then classified. Fine powder of a blue-colored resin composition, said powder having an average particle size of about 7 µm, was obtained. Following conventional methods, colloidal silica was added as a fluidizing agent and the resulting powder was mixed with magnetic iron powder as a carrier, whereby a dry developer of a cyan color for electrophotography was obtained. Using the thus-obtained dry developer of the cyan color for electrophotography, copying was conducted by a negative charge two-component dry elecrophotographic copying machine. A vivid picture of the cyan color was obtained.

EXAMPLE 2

(1) Preparation of Concentrated Diol Dispersions of Red, Yellow and Black Pigments In accordance with the procedures described above under (1) of Example 1, concentrated diol dispersions of red, yellow and black pigments, each having a pigment content of 20%, were prepared using the materials shown in Table 1, respectively.

TABLE 1

| Material used | Concentrated diol dispersion of red pigment | Concentrated diol dispersion of yellow pigment | Concentrated diol dispersion of black pigment |
|---|---|---|---|
| Dimethylquinacridone pigment (C.I. Pigment Red 122) | 17 parts | — | — |
| Phthalimidoinethylated dimethylquinacridone | 3 parts | — | — |
| Yellow pigment of the poly-condensation azo type (C.I. Pigment Yellw 128) | — | 17 parts | — |
| Phthalimidomethylated dis-anthraquinonyl-monophenyl-amino-s-triazine | — | 3 parts | — |
| Carbon black pigment (C.I. Pigment Black 7) | — | — | 17 parts |
| Phathalimidomethylated copper phthalocyanine blue | — | — | 3 parts |
| Bisphenol A-propylene oxide adduct | 80 parts | 80 parts | 80 parts |
| TOTAL | 100 parts | 100 parts | 100 parts |

(2) Condensation Polymerization Reactions of Colored Polyester Resins and Production of Image-recording Materials With respect to each color, condensation polymerization was conducted in accordance with the procedures described above under (3) of Example 1 by using the corresponding materials shown in Table 2. After completion of the reaction, the concentrated charge control agent-resin composition described above under (2) of Example 1 was added and uniformly mixed. In a similar manner as in the procedures (4) of Example 1, the corresponding colored polyester resin was taken out, cooled, coarsely ground and finely ground, followed by the addition of the fluidizing agent and magnetic iron powder. Accordingly, dry developers of magenta, yellow and black colors for electrophotography were produced.

Separately using the dry developers of the three colors obtained above in Example 2, copying was conducted by the negative charge two-component dry elecrophotographic copying machine. Pictures of the vivid colors shown in Table 2 were obtained. Using the four developers consisting of the developer of the cyan color produced in Example 1 and the developers of the magenta, yellow and black colors produced in Example 2, copying was also conducted by a copying machine for negative charge two-component full color developers. As a result, a vivid full-color picture of the four colors was obtained. In addition, the same picture was similarly copied on a transparent polyester film for overhead projectors. As a result, a full-color picture of the four colors, which was able to show a vivid picture on a screen, was obtained.

Using likewise the above-described four/full-color dry developers, a copied vivid four/full-color picture was also successfully outputted by a four/full-color dry electrostatic plotter.

TABLE 2

| | Color and amount (parts) of developer, and color of picture | | |
|---|---|---|---|
| Material used | Magenta color | Yellow color | Black color |
| Bisphenol A-propylene oxide adduct | 711 | 603 | 819 |
| Concentrated diol dispersion of red pigment | 405 | — | — |
| Concentrated diol dispersion of yellow pigment | — | 540 | — |
| Concentrated diol dispersion of black pigment | — | — | 270 |
| Dimethyl terephthalate | 536 | 536 | 536 |
| Zinc acetate | 0.27 | 0.27 | 0.27 |
| Concentrated charge control agent-resin composition | 150 | 150 | 150 |
| Color of picture developed by using the developer | Magenta color | Yellow color | Black color |

EXAMPLE 3

(1) Preparation of Concentrated Pigment-resin Compositions

With respect to each color, the fine powder of the bisphenol-type polyester resin employed in the procedures (2) of Example 1 and the corresponding pigments were premixed in a high-speed mixer in accordance with the corresponding formula described below in Table 3. The resulting mixture was thoroughly kneaded by a heated three-roll mill. The resulting mass was cooled and finely grounded, whereby a concentrated pigment-resin composition containing the pigments at a total concentration of 30% was obtained. It was placed on a slide glass and, after molten under heat, was observed under a microscope. All the pigment particles were found to be finely dispersed without coarse particles.

TABLE 3

| Material used | Resin composition with blue pigment dispersed at high concentation | Resin composition with red pigment dispersed at high concentation | Resin Composition with yellow pigmen dispersed at high concentation | Resin Composition with black pigment dispersed at high concentation |
|---|---|---|---|---|
| Copper phthalocyanine blue pigment (C.I. Pigment Blue 15:3) | 27 parts | — | — | — |
| Phthalimidomethylated copper phthalocyanine blue | 3 parts | — | — | 3 parts |
| Dimethylquinacridone pigment (C.I. Pigment Red 122) | — | 27 parts | — | — |
| Phthalimidomethylated dimethyl quinacridone | — | 3 parts | — | — |
| Yellow pigment of the poly-condensation azo type (C.I. Pigment Yellow 128) | — | — | 27 parts | — |
| Phthalimidomethylated dis-anthraquinonyl-monophenylamino-s-triazine | — | — | 3 parts | — |
| Carbon black pigment (C.I. Pigment Black 6) | — | — | — | 27 parts |
| Fine powder of bisphenol-type polyester resin | 70 parts | 70 parts | 70 parts | 70 parts |
| TOTAL | 100 parts | 100 parts | 100 parts | 100 parts |

(2) Condensation Polymerization Reactions of Colored Polyester Resins and Production of Image-recording Materials With respect to each color, in the condensation polymerization reactor used in the procedures (3) of Example 1, the raw materials for a bisphenol-type polyester resin were charged in accordance with the formula shown below in Table 4. A condensation reaction was conducted under stirring at 230° C. to 240° C. for about 6 hours and, under reduced pressure, the condensation reaction was allowed to proceed further for 2 hours. The pressure of the polymerization reactor was returned to atmospheric pressure, at which the resin composition with the corresponding pigment dispersed at the high concentration therein, which was obtained above in the procedures (1), and the fine powder of the concentrated charge control agent-resin composition obtained in the procedures (2) of Example 1 were added to the resulting molten polymer. They were thoroughly stirred and mixed so that the pigments and the charge control agent were evenly dispersed.

In a similar manner as the procedures (4) of Example 1, the blue-colored polyester resin was then taken out of the polymerization reactor and formed into a thin film through cooling rolls. After the thin film was cooled on a cooling belt, it was coarsely crushed into flakes, finely ground in a jet mill and then classified. Fine powder of a colored resin composition, said powder having an average particle size of about 7 μm, was obtained. Following the conventional methods, colloidal silica was added as a fluidizing agent and the resulting powder was mixed with magnetic iron powder as a carrier. In the manner as described above, dry developers of cyan color, magenta, yellow color and black color for electrophotography were obtained.

Using the thus-obtained dry developer of the cyan color, magenta, yellow color and black color for electrophotography, copying was conducted by a copying machine for negative charge two-component full-color developers in a similar manner as in Examples 1 and 2. Vivid monochrome and four-color pictures were obtained. In a similar manner, copying was conducted on a transparent polyester film for overhead projectors. A four/full-color picture capable of showing a vivid picture on a screen was obtained. Further, using likewise the above-described four/full-color dry developers, a copied vivid full-color picture was also successfully outputted by the four/full-color dry electrostatic plotter.

TABLE 4

| | Color and amount (parts) of developer, and color of picture | | | |
|---|---|---|---|---|
| Material used | Cyan color | Magenta color | Yellow color | Black color |
| Bisphenol A-propylene oxide adduct | 926 | 895 | 848 | 942 |
| Dimethyl terephthalate | 480 | 464 | 440 | 488 |
| Zinc acetate | 0.24 | 0.23 | 0.22 | 0.24 |
| Resin composition with blue pigment dispersed at high concentration | 210 | — | — | — |
| Resin composition with red pigment dispersed at high concentration | — | 270 | — | — |
| Resin composition with yellow pigment dispersed | — | — | 360 | — |

TABLE 4-continued

| | Color and amount (parts) of developer, and color of picture | | | |
|---|---|---|---|---|
| Material used | Cyan color | Magenta color | Yellow color | Black color |
| at high concentration Resin composition with black pigment dispersed at high concentration | — | — | — | 180 |
| Concentrated charge control agent-resin composition | 150 | 150 | 150 | 150 |
| Color of picture developed by using the developer | Cyan color | Magenta color | Yellow color | Black color |

EXAMPLE 4

(1) Production of Polyester Resin

In the condensation polymerization reactor used in the procedures (3) of Example 1, 1,113 parts o the bisphenol A-propylene oxide adduct, 577 parts of dimethyl terephthalate and 0.29 part of zinc acetate were charged. A condensation reaction was conducted under stirring at 230 to 240° C. for about 6 hours. The reaction was allowed to proceed further for 2 hours under reduced pressure, whereby the reaction was brought to completion. The thus-obtained bisphenol-type polyester resin had an average molecular weight of about 7,000, a softening point of 105° C., a glass transition temperature of 55° C., and a 150° C. melt viscosity of about 1,600 poises.

(2) Production of Developers by Kneading in an Extruder

To produce full-color dry developers for electrophotography by using a twin-screw extruder equipped with side feeders, the polyester resin discharge rate of the extruder was set in advance and automatic metering devices of the side feeders were also adjusted to give the below-described amounts.

With respect to each color, the bisphenol-type polyester resin obtained above in the procedures (1) was fed in a molten state into the twin-screw extruder through its hopper from the condensation polymerization reactor by way of an automatic metering device. To add the materials in the respective proportions as shown below in Table 5, the powder of the resin composition with the pigment of the corresponding color dispersed at the high concentration therein, which was obtained in the procedures (1) of Example 3, and the powder of the concentrated charge control agent-resin composition obtained in the procedures (2) of Example 1 were automatically metered and fed by the corresponding automatic metering devices and were charged and added by the corresponding side feeders. They were kneaded with the polyester resin component in a molten state. In the manner as described above, it was possible to obtain image-recording, colored compositions, each of which was good in the dispersion of the corresponding pigment and was even in tone and color density.

TABLE 5

| | Composition of developer, and color of picture | | | |
|---|---|---|---|---|
| Material used | Cyan color dry developer | Magenta color dry developer | Yellow color dry developer | Black color dry developer |
| Bisphenol-type polyester resin | 100.0 | — | — | — |
| Resin composition with blue pigment dispersed at high concentration | 16.8 | — | — | — |
| Resin composition with red pigment dispersed at high concentration | — | 22.4 | — | — |
| Resin composition with yellow pigment dispersed at high concentration | — | — | 31.5 | — |
| Resin composition with black pigment dispersed at high concentration | — | — | — | 14.2 |
| Concentrated charge control agent-resin composition | 12.0 | 12.4 | 13.1 | 11.8 |
| TOTAL | 128.8 | 134.8 | 144.6 | 126.0 |
| Color of picture developed by the developer | Cyan color | Magenta color | Yellow color | Black color |

EXAMPLE 5

Following the procedures described above in connection with the production processes of the developers in Examples 1–4, dry developers of blue color, magenta color, yellow color and black color for electrophotography photography were produced likewise by using corresponding bisphenol-type polyester resins, which had been obtained from the materials shown in Table 6, in place of the bisphenol-type polyester resins formed by the condensation polymerization of the bisphenol A-propylene oxide adduct and dimethyl terephthalate. Using the dry developers of the four colors obtained from the corresponding bisphenol-type polyester resins, respectively, copying was conducted by the copying machine for negative charge two-component full-color developers. Vivid monochrome and four/full-color pictures were obtained. In a similar manner, copying was conducted on a transparent polyester film for overhead projectors. A four/full-color picture capable of showing a vivid picture on a screen was obtained. Further, using likewise the above-described four/full-color dry developers, a copied vivid full-color picture was also successfully outputted by the four/full-color dry electrostatic plotter.

Using these wet electrophotographic developers, copying was conducted by a wet electrophotographic copying machine. Copied pictures of vivid cyan, magenta, yellow and black colors were obtained, respectively. Using the wet developers of the cyan, magenta, yellow and black colors, copying was also conducted by a four/full-color wet elecrophotographic copying machine. As a result, a copied full-color picture was obtained. Further, using the above-described four/full-color wet developers likewise, a copied vivid full-color picture was successfully outputted by a four/full-color wet electrostatic plotter.

TABLE 6

| Material used | | Properties of polyester resin | | | |
|---|---|---|---|---|---|
| Name of material used | Amount (parts) | Number average molecular weight | Softening point (° C.) | Glass transition temperature (° C.) | Viscosity of molten resin (poises/125° C.) |
| Dimethyl terephthalate | 613 | About 6,000 | 105 | 59 | 1,400 |
| Bisphenol A-ethylene oxide adduct (hydroxyl number: 351) | 1,089 | | | | |
| Fumaric acid | 385 | About 7,000 | 105 | 55 | 1,800 |
| Bisphenol A-ethylene oxide adduct (hydroxyl number: 321) | 1,234 | | | | |

EXAMPLE 6

The polyester resin of the blue color was taken out of the polymerization reactor in the procedures (3) of Example 1 and was then formed into a thin film through cooling rolls. After the thin film was cooled on a cooling belt, it was coarsely crushed into flakes, finely ground in a mill. Ten parts of the thus-obtained powder of the blue-colored resin were added, together with 3 parts of a methacrylate ester resin which is soluble in aliphatic hydrocarbon solvents, to 87 parts of "Isopar G" (trade name; product of Exxon Company). Subsequent to addition of ceramic beads as a tumbling medium into a continuous horizontal disperser, the above-obtained mixture was dispersed in the disperser, whereby a concentrated blue stock solution having an average particle size of about 3 μm was prepared. A wet electrophotographic developer was obtained by adding 200 parts by volume of the concentrated stock solution to 1000 parts by volume of "Isopar G".

Similarly, the polyester resins of the magenta color, yellow color and black color were taken out of the polymerization reactor in the procedures (2) of Example 2 and were then formed into thin films through cooling rolls, respectively. After the thin films were cooled on a cooling belt, they were separately coarsely crushed into flakes, finely ground in a mill. With respect to each of the colors, 10 parts of the thus-obtained resin powder were added, together with 3 parts of a methacrylate ester resin which is soluble in aliphatic hydrocarbon solvents, to 87 parts of "Isopar G". Subsequent to addition of ceramic beads as a tumbling medium into a contiguous horizontal disperser, the above-obtained mixture was dispersed in the disperser. In this manner, concentrated magenta, yellow and black stock solutions having an average particle size of about 3 μm were prepared. Wet electrophotographic developers of the magenta color, yellow color and black color were each obtained by adding 200 parts by volume of the corresponding concentrated stock solution to 1000 parts by volume of "Isopar G".

This application claims the priority of Japanese Patent Application No. HEI 9-162020 filed Jun. 5, 1997, which is incorporated herein by reference.

What is claimed is:

1. A process for producing a colored, particulate composition, which comprises:
   a) forming a condensation-polymerized resin, and feeding said resin in molten form to an extruder fitted with an automatic metering device;
   b) charging a colored matter and optionally a charge control agent, and adding the charged coloring matter and optionally the charge control agent through said automatic metering device into said extruder, and mixing said charged coloring matter and optionally the charge control agent with said condensation-polymerized resin in molten form, thereby dispersing the charged coloring matter and optionally the charge control agent throughout the polymerized resin, to form a colored, particulate composition;
   c) cooling said colored composition; and
   d) forming particles of said colored composition, having a size of from about 3 to 20 μm for use as a dry developer.

2. The process of claim 1, wherein said particles of said colored composition are formed by a dry jet mill or a wet dispenser with a tumbling medium contained therein.

3. The process of claim 1, which further comprises adding ferromagnetic carrier material or fluidizing agents.

4. The process of claim 1, wherein said coloring material is selected from the group consisting of oil-soluble dyes, disperse dyes, organic pigments, inorganic pigments, carbon black pigments, and ferromagnetic materials.

5. The process of claim 1, wherein the resin component primarily comprises a polyester resin.

6. The process of claim 5, wherein said polyester resin has a glass transition temperature of at least 50° C.

7. The process of claim 6, wherein said polyester resin has a glass transition temperature of at least 50° C. to 65° C.

8. The process of claim 5, wherein the polyester resin has a softening point of from about 100° C. to 150° C.

9. The process of claim 8, wherein the polyester resin has a softening point of from about 100° C. to 130° C.

10. The process of claim 5, wherein the polyester resin has a number average molecular weight of from about 1,000 to 50,000.

11. The process of claim 10, wherein the polyester resin has a number average molecular weight of from about 5,000 to 10,000.

12. The process of claim 5, wherein a diol component as a raw material for said polyester resin is at least one compound selected from the group consisting of alkylene oxide adducts of bisphenol A, bisphenol F, bisphenol AF, and bisphenol S, in which alkylene chains are C2–C4-alkylene chains, hydrogenation products of said alkylene oxide adducts, bis(hydroxymethyl)naphthalene bis (hydroxymethyl)-durene, p-xylylene glycol, bis (hydroxyethoxy)benzene, bis($\alpha$-hydroxy isopropyl) benzene, and bis(hydroxymethyl)-cyclohexane; and a dicarboxylic acid component of said polyester resin is at least one compound selected from the group consisting of terephthalic acid, isophthalic acid, 4,4'-biphenyl-dicarboxylic acid, naphthalene-2,6-dicarboxylic acid, 1,4-cyclohexanedicarboxylic acid, 1,2-cyclohexanedicarboxylic acid, methylnadic acid, fumaric acid, maleic acid, acid halogenides, and acid anhydrides thereof.

13. The process of claim 5, wherein the polyester resin is formed from an aromatic diol component or an alicyclic diol component, and a dicarboxylic acid component.

14. A process for producing a colored, particulate composition, which comprises:

a) forming a condensation-polymerized resin, and feeding said resin in molten form to an extruder fitted with an automatic metering device;

b) charging a colored matter and optionally a charge control agent, and adding the charged coloring matter and optionally the charge control agent through said automatic metering device into said extruder, and mixing said charged coloring matter and optionally the charge control agent with said condensation-polymerized resin in molten form, thereby dispensing the charged coloring matter and optionally the charge control agent throughout the polymerized resin, to form a colored, particulate composition;

c) cooling said colored composition; and d) forming particles of said colored composition having a size of from about 0.5 to 10 μm for use as a wet developer, and dispersing said particles in a liquid dispersion medium.

15. The process of claim 14, wherein said particles of said colored composition are formed by a dry jet mill or a wet dispenser with a tumbling medium contained therein.

16. The process of claim 14, wherein said coloring matter is selected from the group consisting of oil-soluble dyes, disperse dyes, organic pigments, inorganic pigments, carbon black pigments and ferromagnetic materials.

17. The process of claim 14, wherein said resin component primarily comprises a polyester resin.

18. The process of claim 17, wherein said polyester resin has a glass transition temperature of at least 50° C.

19. The process of claim 18, wherein said polyester resin has a glass transition temperature of from 50° C. to 65° C.

20. The process of claim 17, wherein said polyester resin has a softening point of from about 100° C. to 150° C.

21. The process of claim 20, wherein said polyester resin has a softening point of from about 100° C. to 130° C.

22. The process of claim 17, wherein said polyester resin has a number average molecular weight of from about 1,000 to 50,000.

23. The process of claim 22, wherein said polyester resin has a number average molecular weight of from about 5,000 to 10,000.

24. The process of claim 17, wherein a diol component as a raw material for said polyester resin is at least one compound selected from the group consisting of alkylene oxide adducts of bisphenol A, bisphenol F, bisphenol AF and bisphenol S, in which alkylene chains are $C_2$–$C_4$-alkylene chains, hydrogenation products of said alkylene oxide adducts, bis(hydroxymethyl)naphthalene, bis (hydroxymethyl)-durene, p-xylylene glycol, bis (hydroxyethoxy)benzene, bis($\alpha$-hydroxyisopropyl)benzene, and bis(hydroxymethyl)-cyclohexane; and a dicarboxylic acid component of said polyester resin is at least one compound selected from the group consisting of terephthalic acid, isophthalic acid, 4,4'-biphenyl- dicarboxylic acid, naphthalene-2,6-dicarboxylic acid, 1,4-cyclohexanedicarboxylic acid, 1,2-cyclohexenedicarboxylic acid, methylnadic acid, fumaric acid, maleic acid, acid halogenides, and acid anhydrides thereof.

25. The process of claim 17, wherein the polyester resin is formed from an aromatic diol component or an alicyclic diol component, and a dicarboxylic acid component.

* * * * *